United States Patent [19]

Howard

[11] Patent Number: 4,914,825

[45] Date of Patent: Apr. 10, 1990

[54] SQUARING TOOL

[76] Inventor: Johnny V. Howard, P.O. Box 1357, Douglasville, Ga. 30133

[21] Appl. No.: 302,549

[22] Filed: Jan. 26, 1989

[51] Int. Cl.$^4$ .......................... B43L 13/00; G01B 5/24
[52] U.S. Cl. ....................................... 33/464; 33/427; 33/451; 33/529
[58] Field of Search ................ 33/464, 451, 427, 529, 33/533, 482, 462, 477, 474

[56] References Cited

U.S. PATENT DOCUMENTS

| | | | |
|---|---|---|---|
| 579,952 | 4/1897 | Campbell | 33/427 X |
| 896,847 | 8/1908 | Messner | 33/462 |
| 1,244,570 | 10/1971 | Woods | 33/462 |
| 1,892,032 | 12/1932 | Arnold | 33/809 |
| 3,670,418 | 6/1972 | Hamilton, Jr. | 33/529 |
| 4,380,872 | 4/1983 | Moran | 33/427 |

Primary Examiner—Daniel M. Yasich
Attorney, Agent, or Firm—B. J. Powell

[57] ABSTRACT

A squaring tool comprising a pair of squaring members with two blades, each of the two blades integrally joined together oriented at 45° with respect to each other; a frame assembly defining a passage therethrough having a cross-sectional shape and size such that one of the blades of both of the squaring members are slidably receivable through the passage; and a locking and alignment mechanism for locking the squaring members in the frame assembly.

18 Claims, 5 Drawing Sheets

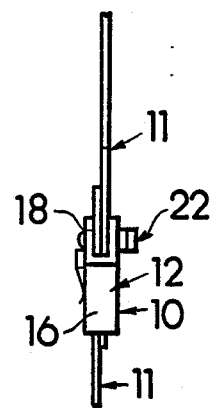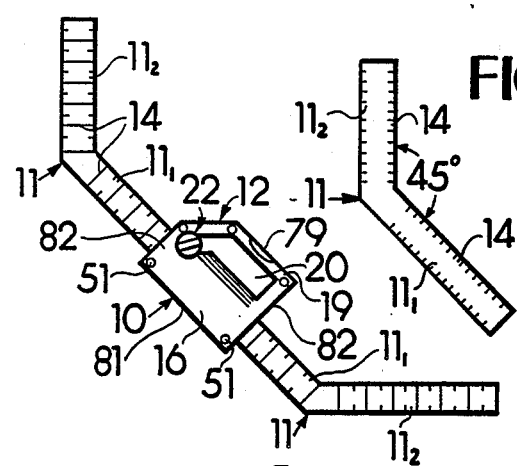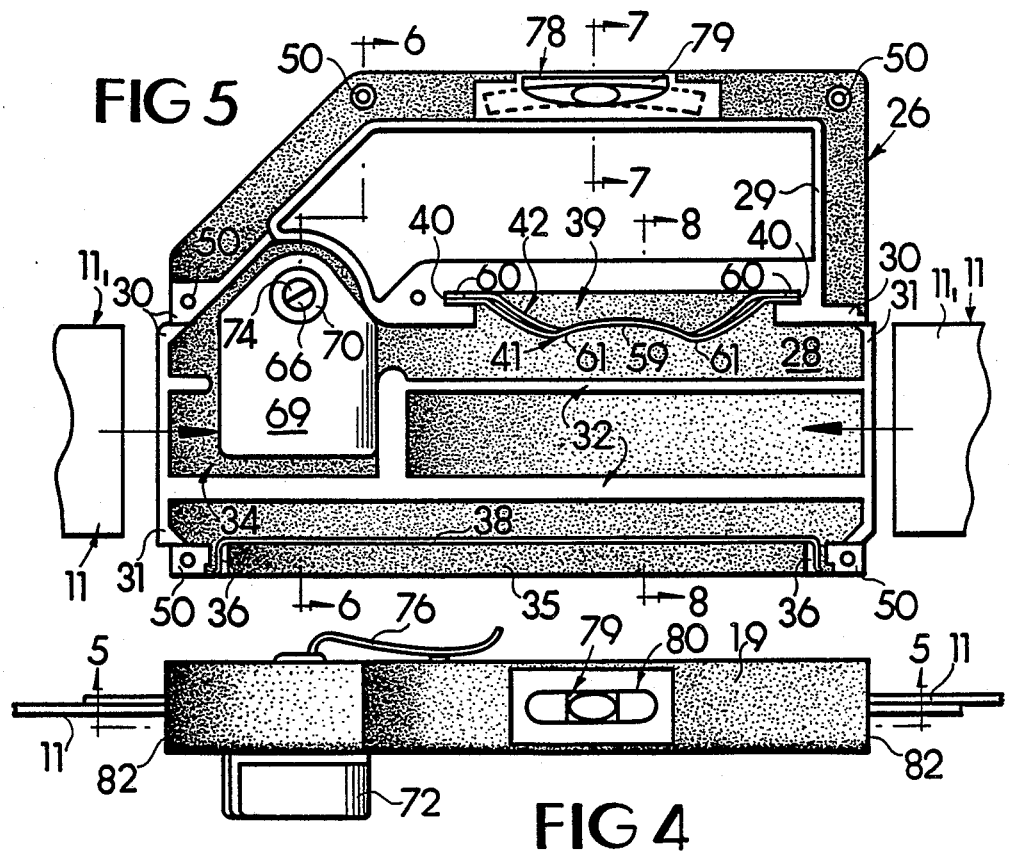

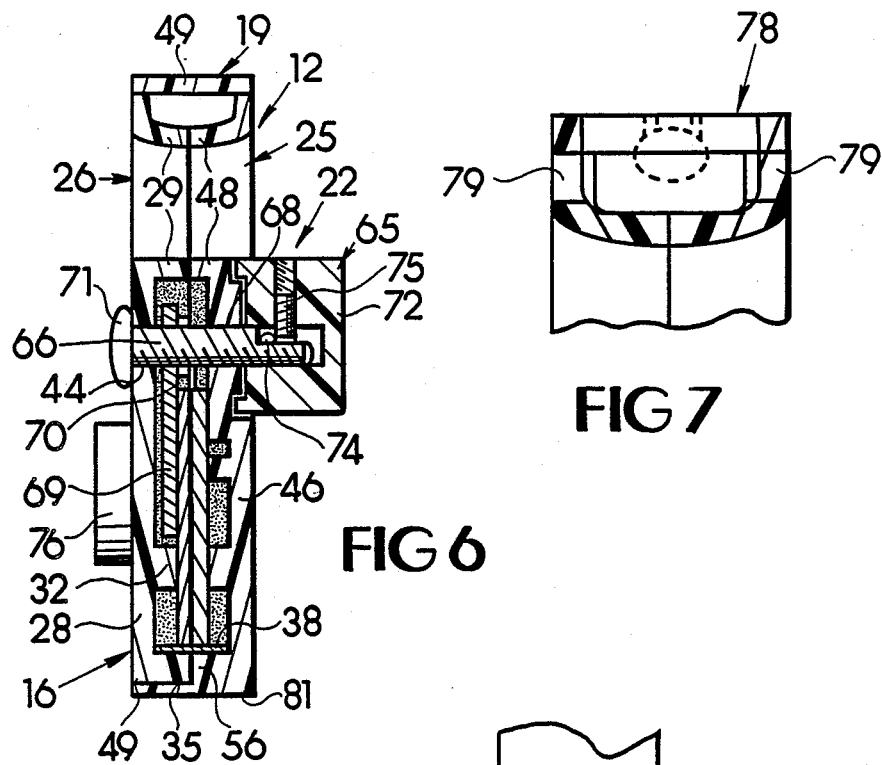
FIG 6
FIG 7
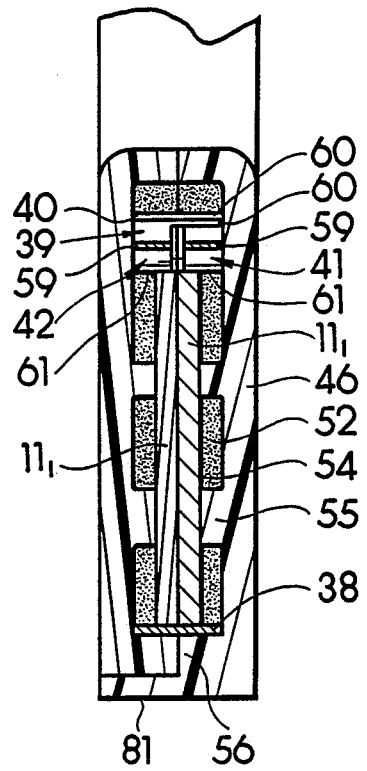
FIG 8

SQUARING TOOL

BACKGROUND OF THE INVENTION

This invention relates generally to squaring devices and more particularly to a squaring device which is adjustable to selectively measure ninety degree angles as well as forty-five degree angles.

Different work regimes such as building construction, pipe fitting, metal fabrication and the like require that parts be squared with respect to each other. Prior art tools for squaring frequently produce poor readings of the correct desired angles due to the difficulty in fitting the tool to the parts and to human error. These squaring tools are frequently used in tasks requiring repeated use of the tool to square structures with the resulting difficulty of maintaining exact readings being multiplied by the by the number of times the squaring operation is repeated. The task sometimes requires guess-work because of limited positions in which the tool can function and limited space in which to use the tool due to the size and shape of the tool. As a result, a reliable tool has not heretofore been available to permit squaring operations to be readily and accurately carried out.

SUMMARY OF THE INVENTION

These and other problems and disadvantages associated with the prior art are overcome by the invention disclosed herein by providing a versatile squaring tool that is designed to take less time and space and produce less error for squaring operations. The tool is particularly useful in the pipe fitting trade as well as use in other trades and the home. The tool has a frame which slidably mounts a pair of squaring members therein that cooperate with each other to perform squaring operations. Each of the squaring members has a pair of blades oriented at 45° with respect to each other. By turning the squaring members to different positions in the frame, angles of 45° and 90° can be set using the tool. Further, the squaring members may be turned so that those blades of the two squaring members lying out of the frame are parallel to and offset with respect to each other. The squaring members are held in selected positions in the frame by a locking and alignment mechanism that forces the blades extending through the frame against a common edge in the frame to keep the squaring members in alignment and also fix the blades relative to the frame to lock the tool. Also provided in a level which permits leveling operations to be performed either in conjunction with squaring operations or as a separate operation.

It is therefore an object of the invention to provide a simple tool with various uses where adjustment is made through smooth sliding movements and the adjustment is maintained with a locking and alignment mechanism for precise alignment of the true angle desired.

Another object of the invention is to provide a squaring tool which provides clearance at the corner where the components being squared meet.

These and other features and advantages of the invention will become more clearly understood upon consideration of the following detailed description and accompanying drawings wherein like characters of reference designate corresponding parts throughout several views and in which:

BRIEF DESCRIPTION OF THE DRAWINGS

FIG. 1 is a side elevational view of the first embodiment of the invention;

FIG. 2 is an end view thereof:

FIG. 3 is a side view of one of the squaring members of the invention;

FIG. 4 is a top view of the frame of the invention;

FIG. 5 is an interior view of the frame taken generally along line 5—5 in FIG. 4;

FIG. 6 is a cross-sectional view taken generally along line 6—6 in FIG. 5;

FIG. 7 is an enlarged cross-sectional view taken generally along line 7—7 in FIG. 5;

FIG. 8 is an enlarged cross-sectional view taken generally along line 8—8 in FIG. 5;

Figure 9:
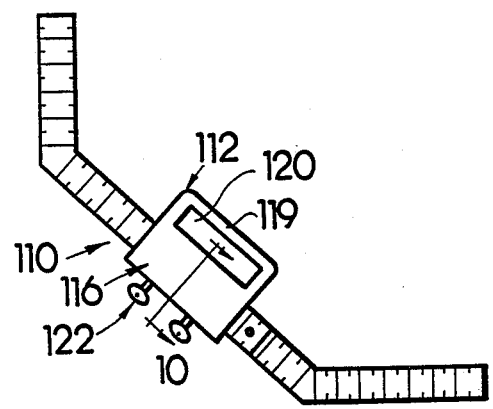
FIG. 9 is a side elevational view of an alternate embodiment of the invention.

These figures and the following detailed description disclose specific embodiments of the invention, however, the inventive concept is not limited thereto since it may be embodied in other forms.

DETAILED DESCRIPTION OF ILLUSTRATIVE EMBODIMENTS

Referring to the figures, it will be seen that the squaring tool 10 includes a support frame assembly 12 which slidably mounts a pair of squaring members 11 therein as best seen in FIGS. 1-3. Each of the squaring members 11 has a pair of thin flat elongate blades $11_1$ and $11_2$ which are integrally joined together at their common ends so that the blades define a 45° angle therebetween. The blades $11_1$ and $11_2$ lie a common plane. It will be appreciated that the blades of the squaring members 11 may be left plain or provided with measurement indicia 14 to assist in locating parts with respect thereto. The measurement indicia 14 illustrated in the figures is typically on an english or metric scale. The blades $11_1$ and $11_2$ may come in different lengths to accommodate different jobs and typically are provided with one blade $11_1$ longer than the blade $11_2$. Typically the longer blade $11_1$ is inserted through the support frame assembly 12 as will become more apparent.

The support frame assembly 12 includes a housing 16 defining a passage 18 therethrough as best seen in FIGS. 5, 6 and 8 to receive one of the blades $11_1$ or $11_2$ of each of the squaring members 11 therethrough in a side-by-side fashion. A handle 19 is formed on one side of the housing 16 with a hand opening 20 between the handle 19 and the housing 16.

To positively align and locate the squaring members 11 in the support frame assembly 12, a locking and alignment means 22 is provided which releasably locks that blade of the two squaring members 11 extending through the passage 18 in alignment with each other and releasably fixes the squaring members 11 axially of the passage 18. This allows the blades of the squaring members 11 to be selectively inserted through the passage 18 and slidably moved therealong to adjust the squaring members 11 with respect to each other in a desired position as will become more apparent.

The housing 16 has a split construction as illustrated in FIGS. 5–8 with a first half-section 25 and a second half-section 26. FIG. 5 shows the interior of the second half-section 26 with the first half-section omitted. The two half-sections are basically mirror images of each other and fit together to define the enclosed housing 16 that forms the passage 18 therethrough.

As seen in FIGS. 5, 6 and 8, the second half-section 26 includes an exterior wall portion 28 which is provided with the hand opening 20 therethrough around which is formed an opening wall portion 29 that cooperates with a like wall portion on the first half-section 25 to define the hand opening 20. End ribs 30 are provided along opposite ends of the exterior wall portion 28 and define cutouts 31 therein that cooperate with similar cutouts in the first half-section 25 to define the passage 18. A rib network 32 extends longitudinally along the interior of wall portion 28 along the passage 18 to support the sides of the blades on the squaring members 11 passing through the passage 18 as will become more apparent. On the second half-section 26, the rib network 32 defines a locking recess 34 which mounts part of the locking and alignment means as will become more apparent. That part of the exterior wall portion 28 opposite the opening 20 is provided with a locating rib 35 which is notched at 36 to permit a wear member 38 to be placed therein and form the support surface along one side of the passage 18 along which the blades on the squaring members 11 ride for alignment and locking during use as will become more apparent. That part of the exterior wall portion 28 adjacent the hand opening 20 is provided with a spring recess 39 which opens into the passages 18 extending along the second half-section 26. The spring recess 39 is provided with locating slots 40 at opposite ends thereof which are designed to receive a pair of undulating spring members 41 and 42 as will become more apparent. A mounting hole 44 is provided through the exterior wall portion 28 in the locking recess 34 so that the mounting hole 44 is oriented normal to the axis of the passage 18 and out of interference with the passage 18 as will become more apparent.

The first half-section 25 is also provided with an exterior wall portion 46 with an opening wall portion 48 around the hand opening 20 that cooperates with the wall portion 29 on the second half-section to enclose the housing when the two half-sections are fitted together. The exterior wall portion 46 defines an upstanding sidewall portion 49 which extends around the periphery of the exterior wall portion 46 to mate with the exterior wall portion 28 on the second half-section 26 to enclose the housing. Appropriate threaded bosses 50 are provided on the second half-section 26 and cooperate with the holes through the first half-section 25 to allow the housing 16 to be connected together with the appropriate fasteners 51. The exterior wall portion 46 is also provided with end ribs 52 that define cutouts 54 therein and cooperate with the cutouts 31 on the second half section 26 to define the passage 18 therebetween. A rib network 55 is also provided on the first half-section 25 to support the blades on the squaring members 11 opposite the rib network 32. The first half section 25 is also provided with a locating rib 56 to cooperate with the rib 35 in the second half-section to support the wear member 38.

The spring members 41 and 42 each include an enlongate undulating resilient section 59 with a locating tab 60 on each of the opposite ends thereof oriented generally normal to the enlongate section 59 and projecting outwardly on one side thereof. One of the spring members 41 is placed in the locating slots 40 so that the tabs 60 thereon extend in one direction with the other spring member 42 placed in the slots 40 so that the tabs 60 extend in the opposite direction. This locates the enlongate sections 59 of the two springs in a side-by-side relationship with the projectingmost crests 61 of the sections 59 lying within the passage 18. When the blades of the squaring members 11 are inserted through the passage 18 in a side-by-side relationship, the crests 61 on the springs 41 and 42 engage each of the blades on the squaring members 11 individually so that each blade is individually pressed against the wear member 38 to keep the two blades aligned. The spring members 41 and 42 thus constitute the alignment portion of the locking and alignment means 22.

To selectively lock the blades of the squaring members 11 within the passage 18, a locking assembly 65 forming the locking portion of the locking and alignment means 22 is provided in the locking recess 34 in the rib network 32 on the second half-section 26. The locking assembly 65 includes a threaded member 66 which rotatably extends through the mounting hole 44 in the exterior wall portion 28 of the second half section 26 and a similar mounting hole 68 in the exterior wall portion 46. The threaded member 66 mounts a locking plate 69 thereon within the recess 34. The locking plate 69 is provided with a threaded boss 70 that threadedly engages the threaded member 66 so that rotation of the threaded member 66 causes the threaded boss 70 and thus the locking plate 69 to move axially along the threaded member 66 and thus move transversely of the axis of the passage 18. The locking plate 69 is located coplanar with the sides of the blades of the squaring members 11 and has a thickness thinner than the depth of the recess 34 so that the locking plate 69 lies within the recess 34 when the locking plate is fully retracted. Likewise, rotating the threaded member 66 causes the locking plate 69 to move out of the locking recess 34 and frictionally engage the side of the blade $11_1$ nearest the locking plate 69 extending along the passage 18 so that the blades on the squaring members 11 will be locked in place but can be released to be slidably positioned along the passage 18 as will become more apparent. To rotatably position the threaded member 66, a head 71 is provided on that end of the threaded member 66 projecting through the second half section 26 while a knob 72 is provided on the opposite end thereof projecting through the first half section 25. The end of the threaded member 66 projecting into the knob 72 is flattened at a notch 74 so that a set screw 75 in the knob 72 locks the knob 72 onto the threaded member 66 both rotationally and axially to maintain the threaded member 66 axially in place within the housing 16. Rotation of the knob 72 rotates the threaded member 66 to selectively clamp and unclamp the blades of the squaring members 11 extending through the passage 18.

An appropriate clip 76 is provided on the exposed side of the exterior wall portion 28 on the second half-section 26 to permit the tool to be clipped on the user's belt or clothing. This facilitates the storing and transport of tool 10.

Further, a level 78 is mounted in the handle 19 of the housing 16 with the sides of the handle 19 being provided with cutouts 79 so that the level 78 can be viewed therethrough. Further, the level is provided with a viewing opening 80 in the outside surface of the handle 19 so that the bubble in the level 78 can be viewed therethrough. The level 78 is oriented with respect to the opposite edge surface 81 of the housing 16 so that the bubble in the level 78 is centered when the edge surface 81 is horizontal. Thus, edge surface 81 can be used to level horizontally while the opposite end surface 82 on housing 16 can be used to orient parts vertically.

Figure 10:
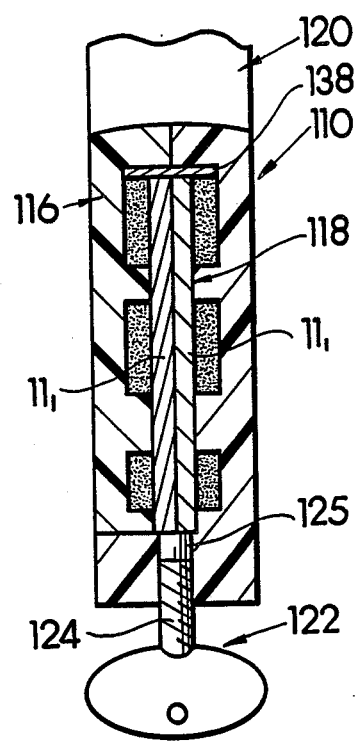
FIG. 10 is an enlarged cross-sectional view taken generally along line 10—10 in FIG. 9.

FIGS. 9 and 10 illustrate an alternate embodiment of the tool which has been designated 110. The squaring tool 110 has a support frame assembly 112 which slidably mounts the squaring members 11 therein.

The support frame assembly 112 includes a housing 116 defining a passage 118 therethrough as best seen in FIG. 10 to receive one of the blades $11_1$ or $11_2$ of each of the squaring members 11 therethrough in a side-by-side fashion as with tool 10. A handle 119 is formed on one side of the housing 116 with a hand opening 120 between the handle 119 and the housing 116.

To positively align and locate the squaring members 11 in the support frame assembly 112, a locking and alignment means 122 is provided which releasably locks that blade of the two squaring members 11 extending through the passage 118 in alignment with each other and releasably fixes the squaring members 11 axially of the passage 118. Means 122 includes screws 124 threadedly extending through housing 116 to force a follower plug 125 into passage 118 to engage members 11 and selectively force the blades against the wear member 138 to lock the blades in position.

Figure 11:
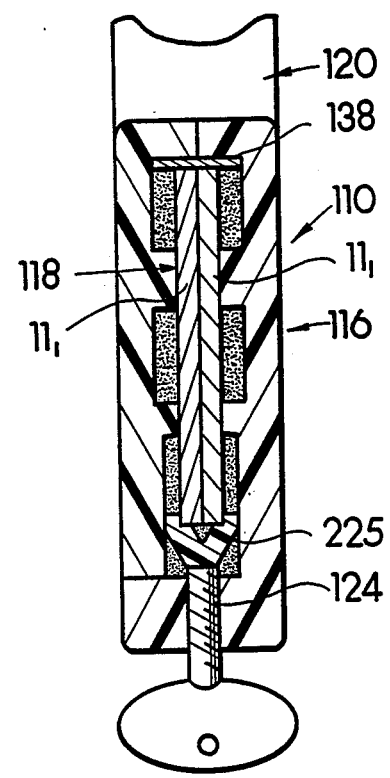
FIG. 11 is an enlarged cross sectional view taken generally along line 10—10 in FIG. 9 and showing a modification to the second embodiment of the invention.

FIG. 11 shows a modification of the embodiment of FIGS. 9 and 10. Instead of the follower plug 125 in FIG. 10, an enlongated follower angle 225 is provided which serves to equalize the clamping forces on the two blades in passage 118.

FIGS. 9 and 10 illustrate an alternate embodiment of the tool which has been designated 110. The squaring tool 110 a support frame assembly 112 which slidably mounts the squaring members 11 therein. Each of the squaring members 11 has a pair of thin flat elongate blades $11_1$ and $11_2$ which are integrally joined together at their common ends so that the blades define a 45° angle therebetween. The blades $11_1$ and $11_2$ lie a common plane. It will be appreciated that the blades of the squaring members 11 may be left plain or provided with measurement indicia 14 to assist in locating parts with respect thereto. The measurement indicia 14 illustrated in the figures is typically on an english or metric scale. The blades $11_1$ or $11_2$ may come in different lengths to accommodate different jobs and typically are provided with one blade $11_1$ longer than the blade $11_2$. Typically the longer blade $11_1$ is inserted through the support frame assembly 12 as will become more apparent.

The support frame assembly 112 includes a housing 116 defining a passage 118 therethrough as best seen in FIG. 10 to receive one of the blades $11_1$ or $11_2$ of each of the squaring members 11 therethrough in a side-by-side fashion as with tool 110. A handle 119 is formed on one side of the housing 116 with a hand opening 120 between the handle 19 and the housing 116.

To positively align and locate the squaring members 11 in the support frame assembly 112, a locking and alignment means 122 is provided which releasably locks that blade of the two squaring members 11 extending through the passage 118 in alignment with each other and releasably fixes the squaring members 11 axially of the passage 118. Means 122 includes screws 124 threadedly extending through housing 116 into passage 118 to engage members 11 to be selectively force the blades against the wear member 138 to lock the blades in position.

FIG. 11 shows a modification of the embodiment of FIGS. 9 and 10. Instead of the follower plug 125 in FIG. 10, an enlongate follower angle 225 is provided which serves to equalize the clamping forces on the two blades in passage 118.

OPERATION

FIGS. 12-23 illustrate various uses of the tool 10, it being understood that tool 110 would be similarly used. Not only does tool 10 allow parts to be squared with respect to each other as does prior art squares but also permits 45° angles to be set as well as offset parallel surfaces. Further, the tool 10 permits parts to be aligned which would interfere with prior art tools.

Figure 12:
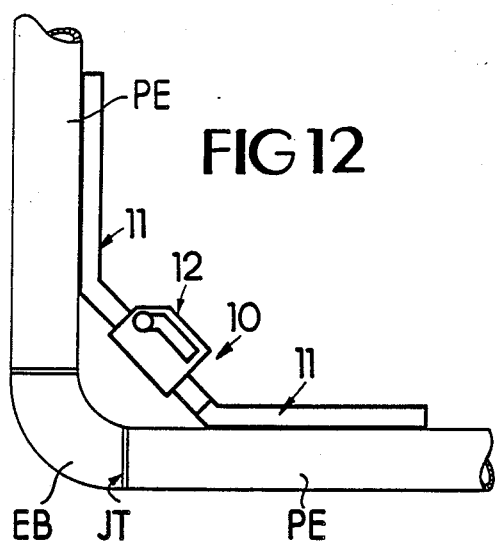
FIGS. 12-23 are schematic views illustrating the invention in use.

FIG. 12 illustrates tool 10 being used to align pipes PE at right angles to each other where the pipes PE are connected by a curved elbow EB. The blades of the two squaring members 11 projecting out from support frame assembly 12 are adjusted so that the pipes PE lie along the blades while the frame assembly 12 is spaced away from elbow EB to clear same. This also permits the joints JT to be welded without interference with tool 10.

Figure 13:
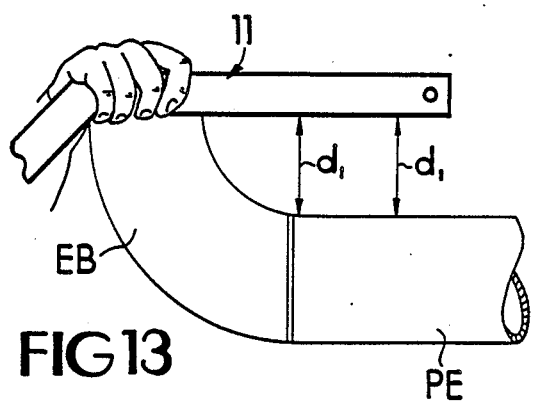

FIG. 13 illustrates one of the squaring members 11 being used to square the end of an elbow EB to a pipe PE. One of the blades of member 11 is used and placed across the open end of elbow EB. The distance $d_1$ between the blade and pipe PE is measured in two places and the elbow adjusted until two distances $d_1$ are equal.

Figure 14:
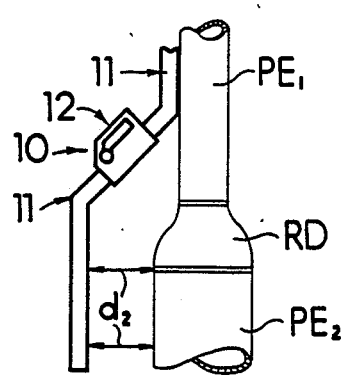

FIG. 14 illustrates the tool 10 used to provide coaxial alignment between two pipes $PE_1$ and $PE_2$. The particular pipes illustrated have different diameters with a reducer RD therebetween. The projecting blades on the two squaring members 11 are positioned in the support assembly 12 so that they are parallel to each other. This also places the projecting blades of the two squaring members so they are offset with respect to each other. One of the projecting blades on the squaring members 11 is placed against the pipe $PE_1$ while the other blade is located laterally out from the pipe $PE_2$. The distance $d_2$ between the projecting blade and the pipe $PE_2$ is measured in two places and the pipes adjusted until these two distances $d_2$ are equal.

Figure 15:
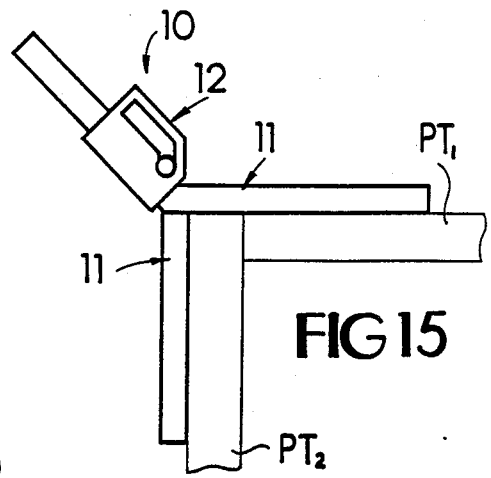

FIG. 15 illustrates the tool 10 being used to square two members in the same manner a framing square is used. The two parts $PT_1$ and $PT_2$ are to be oriented normal to each other. The squaring members 11 are inserted in the support assembly 12 so that the projecting blade on each of the members 11 extends from the same end of the support assembly 12 but are rotated 180° with respect to each other so that the projecting blades are normal to each other. In this way, the projecting blades can be placed on the parts $PT_1$ and $PT_2$ so that parts are normal when they abut the respective blades on the squaring members 11.

Figure 16:
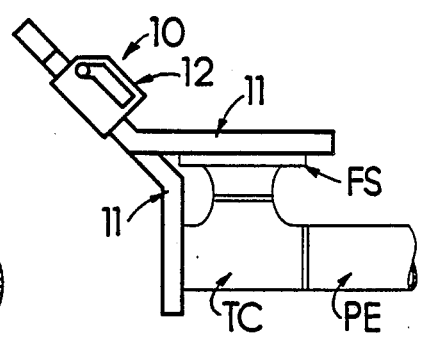

FIG. 16 illustrates the tool 10 being to align a flange section FS with a tee connector TC which is mounted on a pipe PE. The face of the flange section FS is oriented using one of the projecting blades of the member 11 while the other projecting blade is oriented in the support assembly 12 so that it is normal to the projecting blade of the first mentioned squaring member 11.

The squaring members 11 can then be adjusted with respect to each other so that the juncture between the two blades on each of the squaring members 11 are offset with respect to each other so as to clear the flange on the flange section FS. This allows the projecting blade on the other member 11 to be placed across the open end of the tee connector TC so that the face of the flange FS is normal to the open end of the tee connector TC.

Figure 17:
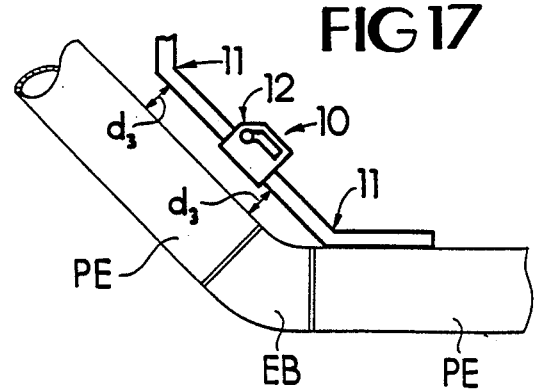

FIG. 17 illustrates the tool 10 being used to align two pipes PE at a 45° angle with respect to each other through a 45° elbow EB. The squaring members 11 are placed in the support assembly 12 so the projecting blades on the squaring members 11 extend from opposite ends of the support assembly 12 and extend away from the blades extending through support assembly 12 in the same direction. One of the projecting blades is place against one of the pipes PE while the blade which extend through the carrier assembly 12 will be parallel to the other pipe PE to be located at 45°. This allows the distance $d_3$ between the blades through assembly 12 along the pipe PE to be measured and moved until these two measurements are equal.

Figure 18:
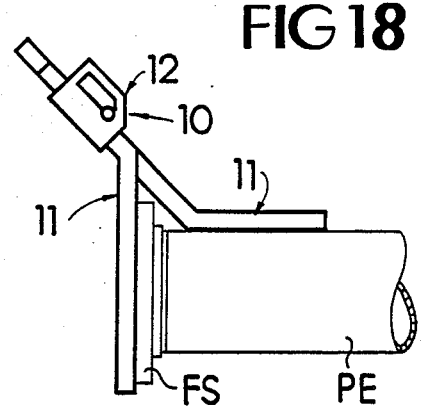

FIG. 18 illustrates the tool 10 being to orient a flange section FS on the end of a pipe PE. The squaring members 11 are oriented in the support assembly 12 similar to that shown in FIG. 16 so that one of the projecting blades on the squaring members 11 can be place against the side of the pipe PE while the other projecting blade can be placed on the face of the flange section FS with the offset between the juncture of the two blades in the two squaring members 11 being such that the flange on the flange section FS is cleared.

Figure 19:
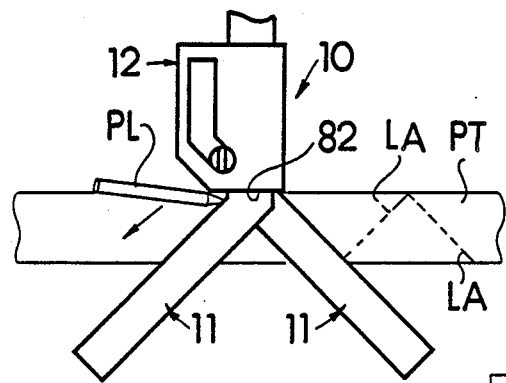

FIG. 19 illustrates the tool 10 being used to mark lines at 45° angles across part PT. The lines are marked with a reference LA. The squaring members 11 are located in the support assembly 12 so that the projecting blades on the two squaring members 11 project out from the same end of the support assembly 12 and thus are oriented perpendicular to each other. The two squaring members 11 are moved into the support assembly 12 so that the juncture between the two blades in each of the squaring members 11 lies at the end surface 82 on the end of the support assembly 12. In this manner, the end surface 82 can be placed against the side of the part PT and a pencil PL or other appropriate marker can be used to mark along the edges of the projecting blades of the members 11 to mark a 45° angle across the part PT.

Figure 20:
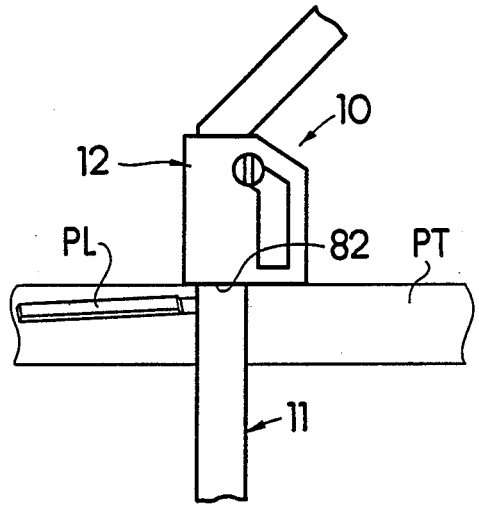

FIG. 20 illustrates the tool 10 being used to mark lines across the part PT which are normal to the edge of the part. The tool 10 is turned so that that end surface 82 on the support assembly 12 which is normal to the blades extending through the support assembly 12 as placed against the edge of the part PT. An appropriate pencil PL or other marking device is used to mark along the edge of the blades lying across the part PT so that lines which are square with respect to the edge of the part are formed.

Figure 21:
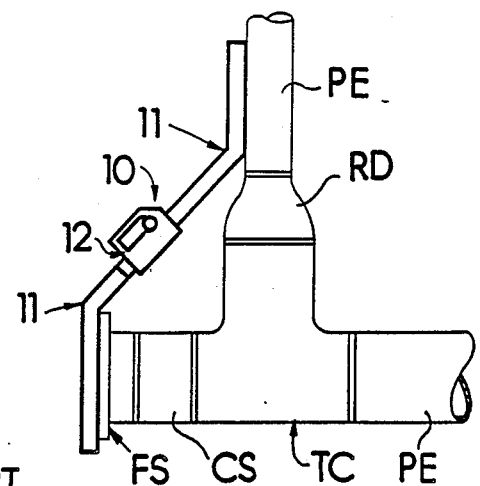

FIG. 21 illustrates the tool 10 being used to square a flange section FS with respect to a pipe run that includes a tee connector TC. The particular pipe network illustrated includes a pipe PE connected to one of the ends of the connector TC while the flange section FS is connected to the other end of the aligned outlets from the connector TC through a connecting section CS. The normal outlet from the connector TC is connected to a smaller pipe PE through a reducer RD. The projecting blades on the members 11 are oriented so they are parallel to each other and project out from opposite ends of the support assembly 12. This allows the axially adjustment of each of the squaring members 11 to be made until one of the projecting blades lie across the face flange section FS while the other lies along the edge of the pipe PE normal to the pipe run to which the flange section FS is to be attached. This allows the tool 10 to accommodate different spacing for the flange section FS without having to make any measurements.

Figure 22:
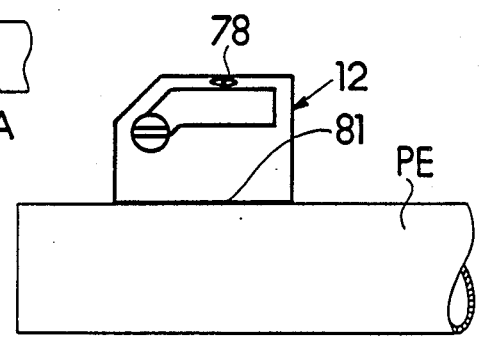
Figure 23:
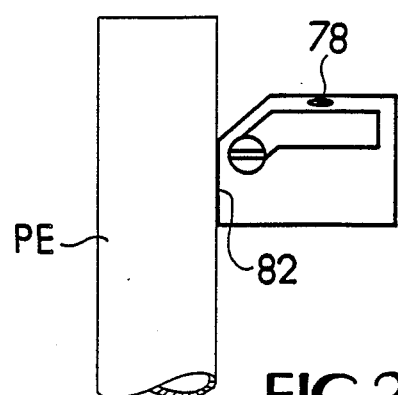

FIG. 22 shows the level 78 being used to level a pipe PE horizontally by placing the edge surface 81 on the support assembly 12 against the edge of the pipe PE. Likewise FIG. 23 illustrates the level 78 in the support assembly 12 being used to vertically orient a pipe by placing the edge of the pipe PE against one of the end surfaces 82 on the support assembly 12. In both cases, the pipe will be horizontally or vertically oriented when the bubble in the level 78 is centered.

I claim:

1. A squaring tool comprising:
   a pair of squaring members, each said squaring members including two blades joined together so that said blades lie in a common plane and are oriented with a 45° angle therebetween;
   a frame assembly defining a blade passage therethrough having a cross-sectional shape and size such that one of said blades of both of said squaring members is slidably received through said blade passage in a juxtaposed relationship, said frame assembly defining a common edge surface along said blade passage to slidably support both of said blades in said blade passage therethrough;
   a metal wear member replaceably mounted in said frame assembly and defining said common edge in said blade passage to slidably support said blades thereon and
   locking and alignment means mounted on said frame and adapted to engage each of said blades in said passage to force said blades against said common edge surface to maintain alignment therebetween and to selectively fix said blades axially of said passage whereby said squaring members are adjustably mounted in said frame so that the other of said blades of both of said squaring members located outside said opening can be selectively located normal to each other and parallel to each other.

2. The tool of claim 1 wherein said frame assembly includes a locating rib therein adjacent said blade passage to support said wear member thereon, said locating rib defining retention means thereon to maintain said wear member in place while said squaring members are removed from said blade passage.

3. The tool of claim 2 wherein said frame assembly further includes a pair of opposed rib networks defining said blade passage therebetween, said frame assembly further defining a clearance space adjacent said locating rib wider than the total thicknesses of said blades of said squaring members within said blade passage and said wear member having a transverse width greater than the total thicknesses of said blades to insure that both blades of said squaring members in said blade passage are supported on said wear member.

4. The tool of claim 3 wherein said alignment means includes spring means projecting into said blade passage opposite said wear member to resiliently urge both said blades of said squaring members toward said wear member and maintain said blades in alignment with each other.

5. The tool of claim 4 wherein said spring means includes:
- a first spring member engaging said blade of one of said squaring members in said blade passage independently of said blade of the other of said squaring members; and,
- a second spring member engaging said blade of the other of said squaring members independently of said blade of the one of said squaring members so that said blades in said blade passage are urged toward said wear member independently of each other to insure alignment without regard to wear.

6. The tool of claim 5:
- wherein each of said spring members has opposed ends and includes a resilient undulating elongate central section resiliently engaging one of said blades and tab sections on said opposed ends to maintain said spring member in position; and
- wherein said frame assembly defines locating slots therein sized to receive said tab sections on said spring members therein and located to position said spring members relative to said blades in said blade passage to independently urge said blades toward said wear member.

7. A squaring tool comprising:
- a pair of squaring members, each said squaring members including two blades joined together so that said blades lie in a common plane and are oriented with a 45° angle therebetween;
- a frame assembly defining a blade passage therethrough having a cross-sectional shape and size such that one of said blades of both of said squaring members are slidably received through said blade passage in a juxtaposed relationship, said frame assembly defining a common edge surface along said blade passage to slidably support both of said blades in said blade passage thereon; and
- locking and alignment means mounted on said frame assembly and adapted to engage each of said blades in said passage to force said blades against said common edge surface to maintain alignment therebetween and to selectively fix said blades axially of said blade passage whereby those blades of said squaring members located outside said frame assembly can be selectively located normal to each other and parallel to each other, said locking means including a locking plate lying adjacent to and laterally of said blades in said blade passage and drive means interconnecting said locking plate and frame assembly for forcing said locking plate against the side of said blades to clamp said blades within said blade passage.

8. The tool of claim 7 wherein said drive means includes a threaded member rotatably mounted in said frame assembly about an axis normal to said locking plate, said threaded member axially fixed relative to said frame assembly and said blade passage and threadedly engaging said locking plate to selectively move said locking plate toward and away from said blades in said blade passage to clamp and release said blades therein.

9. The tool of claim 8 further including a manually engageable drive member mounted on said threaded member exteriorly of said frame assembly for manually rotating said drive member.

10. A squaring tool comprising:
- a pair of squaring members, each said squaring members including two blades jointed together so that said blades lie in a common plane and are oriented with a 45° angle therebetween;
- a frame assembly defining a blade passage therethrough having a cross-sectional shape and size such that one of said blades of both of said squaring members is slidably received through said blade passage in a juxtaposed relationship, said frame defining a common edge surface along said blade passage to slidably support both of said blades in said blade passage thereon, said frame assembly including a housing defining said blade passage therethrough and a handle on one side of said housing, said housing having a split construction with first and second half-sections that fit together to form said blade passage; and
- locking and alignment means mounted on said frame assembly and adapted to engage each of said blades in said passage to force said blades against said common edge surface to maintain alignment therebetween and to selectively fix said blades axially of said blade passage whereby those blades of said squaring members located outside said frame assembly can be selectively located normal to each other and parallel to each other.

11. The tool of claim 10:
- wherein said half-sections each define a rib network on the interior thereof that form opposite sides of said blade passage, said rib network on one of said half-sections defining a locking recess therein opening into said blade passage and
- wherein said locking and alignment means includes a locking plate lying within said locking recess adjacent to and laterally of said blades in said locking plate and frame assembly for forcing said blade passage and drive means interconnecting said locking plate against the side of said blades to clamp said blades within said blade passage.

12. The tool of claim 11:
- wherein each of said half-sections defines a locating rib thereon located adjacent that edge of said blade passage opposite said locking and alignment means and
- further including a metal wear member mounted on said locating ribs to define said common edge in said blade passage and slidably support said blades thereon.

13. The tool of claim 12:
- wherein said rib networks define a clearance space adjacent said locating ribs wider than the total thicknesses of said blades of said squaring members within said blade passage and
- wherein said wear member has a transverse width greater than the total thicknesses of said blades to insure that both blades of said squaring members in said blade passage are supported on said wear member.

14. The tool of claim 13 wherein said alignment means includes spring means projecting into said blade passage opposite said wear member to resiliently urge both said blades of said squaring members toward said wear member and maintain said blades in alignment with each other.

15. The tool of claim 14 wherein said spring means includes:
- a first spring member engaging said blade of one of said squaring members in said blade passage independently of said blade of the other of said squaring members; and, a second spring member engaging said blade of the other of said squaring members independently of said blade of the one of said squaring members so that said blades in said blade passage are urged toward said wear member independently of each other to insure alignment without regard to wear.

16. The tool of claim 15:
wherein each of said spring members has opposed ends and includes a resilient undulating elongate central section resiliently engaging one of said blades and tab sections on said opposed ends to maintain said spring member in position; and
wherein said frame assembly defines locating slots therein sized to receive said tab sections on said spring members therein and located to position said spring members relative to said blades in paid blade passage to independently urge said blades toward said wear member.

17. The tool of claim 16 wherein said drive means includes a threaded member rotatably mounted in said frame assembly about an axis normal to said locking plate, said threaded member axially fixed relative to said frame assembly and said blade passage and threadedly engaging said locking plate to selectively move said locking plate toward and away from said blades in said blade passage to clamp and release said blades therein.

18. The tool of claim 17 further including a manually engageable drive member mounted on said threaded member exteriorly rotating said drive member.

* * * * *